Dec. 30, 1969    R. L. GOWAN    3,487,317
SYSTEM FOR ISOLATING A SINGLE PULSE FROM A SERIES OF PULSES
Filed Jan. 11, 1966

INVENTOR.
RICHARD L. GOWAN
BY
ATTORNEYS

United States Patent Office 3,487,317
Patented Dec. 30, 1969

3,487,317
SYSTEM FOR ISOLATING A SINGLE PULSE FROM A SERIES OF PULSES
Richard L. Gowan, Coronado, Calif., assignor to the United States of America as represented by the Secretary of the Navy
Filed Jan. 11, 1966, Ser. No. 520,315
Int. Cl. H03k 5/18, 19/24
U.S. Cl. 328—110                                    2 Claims

ABSTRACT OF THE DISCLOSURE

The signal circuit of an AND gate is connected between a source of a series of pulses on the one hand and a pulse width measuring equipment on the other. A one-shot multivibrator is connected to the control terminal of the gate. The unstable state of the multivibrator is adjusted in duration to exceed one time interval of the series but less than two time intervals to guarantee an open gate for one pulse only. Logic circuitry is provided for randomly turning on the multivibrator.

This invention relates to means for isolating a pulse, and is particularly directed to means for deriving in an insulated circuit a single pulse taken from among a series of high frequency pulses.

In developing systems for testing complex pulse handling circuits, it has been found desirable to measure the width of a pulse as well as the amplitude, repetition rate and other parameters. Much can be determined concerning the performance of a computer or a radar transmitter, for example, for examining the wave-shape, including the pulse width, of the pulses of the equipment. Such testing obviously does not admit the integration of a series of pulses. Instead, a single pulse must be isolated without distortion for measurement of pulse width.

The object of this invention is to remove the single pulse from among a series of pulses without distortion of the selected pulse. The object of this invention is attained by connecting the signal circuit of an AND gate between the source of pulses to be tested on the one hand and the pulse width measuring equipment on the other. The gate is enabled by a one-shot multivibrator the unstable, or set, voltage of which is adjusted in duration to exceed one time interval, between two adjacent pulses of the series, but less than two time intervals. It will be seen that the gate can pass one pulse only.

Other objects and features of this invention will become apparent to those skilled in the art by referring to the following specification and to the accompanying drawings in which.

Figure 1:
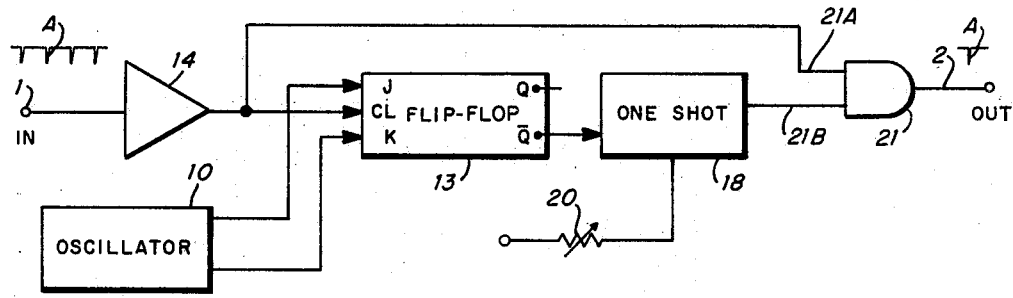
FIG. 1 is a block diagram of one pulse isolation system of this invention.

The input terminal 1 of FIG. 1 is connected to any point in electronic gear to be tested which contains a series of pulses. The circuit to be tested might, for example, comprise radar pulses or the telemetering pulses of a control system where the repetition rates may extend up to megacycles per second. It is desired that one pulse, A, of the series be isolated and made to appear at the output terminal 2. From output terminal 2 the pulse A is measured in amplitude, or in width as more fully described in co-pending application, Ser. No. 523,468, filed Jan. 27, 1966.

Preferably, amplifier 14 is provided adjacent the input terminal and given the desired amount of gain to normalize the amplitude of the pulses. The amplifier should be broadbanded so as to minimize distortion of the pulses to be tested.

All of the pulses of the series are applied through line 21A to the input terminal of the AND gate 21. The gate 21 comprises a signal circuit connected between the signal input terminal at 21A and the output terminal at 2. The signal circuit of the AND gate is switched open or closed by appropriate voltages applied to the control circuit terminal 21B of the gate. According to this invention the gate is normally disabled but an enabling voltage is applied to the other input 21B of the AND gate, the duration of the enabling voltage being equal to or slightly more than the expected time interval between pulses of the series. The one pulse, A, only is passed.

The enabling voltage pulse is provided, in the specific embodiment shown, by the one-shot multivibrator 18. The unstable, or set, voltage of the multivibrator is of the proper polarity and amplitude to operate gate 21. The duration of the enabling pulse generated by the one-shot or monostable multivibrator is adjustable, as by the variable resistance 20. That is, resistance 20 could, if desired, control the time constant of the multivibrator.

As stated, the enabling pulse on line 21B of the AND gate is so timed and is of such duration as to permit one and only one pulse, A, to pass through the gate, and the preferred device for generating the enabling pulse of the proper timing and duration is a so-called one-shot or monostable multivibrator. The output voltage of multivibrator 18, FIG. 1, is applied to the control or input terminal 21B of the AND gate while the control or input voltage for igniting or triggering the multivibrator is obtained from the output of flip-flop 13. If now, the pulse series to be tested is employed as the normal clock source for the flip-flop, the flip-flop can be made to change state precisely upon the occurrence of one of the pulses of the series. It follows that the ensuring enabling pulse generated by the one-shot will, with certainty, span the next succeeding series pulse and will gate out that next succeeding pulse only.

The particular flip-flop 13 shown is of the type commerically known as the J–K flip-flop which in the present application requires two simultaneous and complementary inputs, at terminal J and K to ready the flip-flop for change of state which is effected by the clock pulse. The logic of the flip-flop is treated for example, in the textbook by Phister entitled "Logic Design of Digital Computers," Wiley 1959, the J–K flip-flop being explained on pages 128, et seq. The clock terminal, CL, is connected to the output of amplifier 14 and the J and K terminals are connected to the two terminals of oscillator 10. The oscillator 10 is free-running and is, in general, not synchronized with the remaining circuit. The frequency of the oscillator may be relatively low compared to the frequency of the pulses to be tested, the oscillator frequency being merely high enough to permit processing, by measuring equipment not shown, of each isolated pulse as it is derived.

Figure 2:
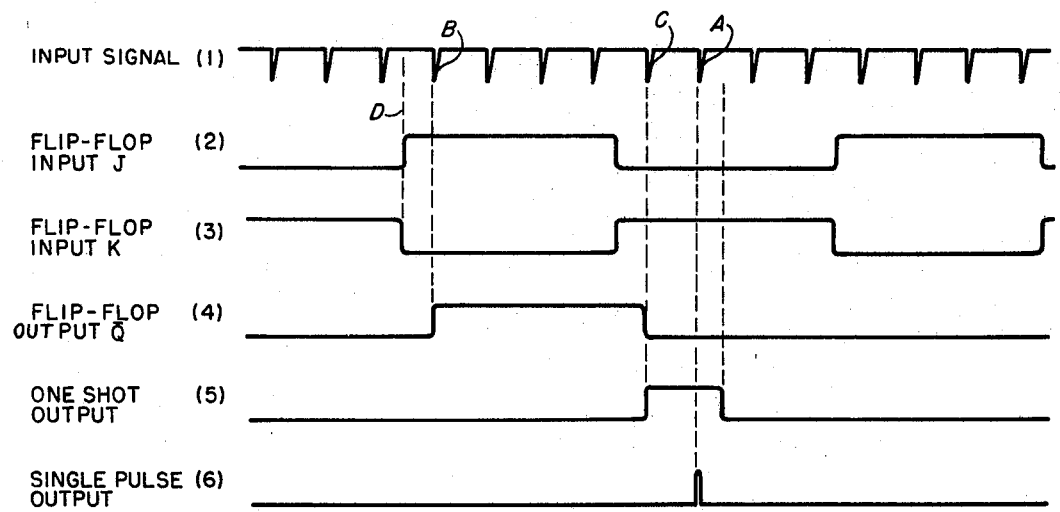
FIG. 2 is a waveform diagram showing the time relationships of the principal voltages of the system of FIG. 1.

Representative time values and mode of operation may be understood by referring to the time charts of FIG. 2. On line 1 is shown the series of pulses the frequency, amplitude and width of which are of interest. It is necessary that one pulse such as pulse A be isolated. On lines 2 and 3 of FIG. 2 are shown the complementary output voltages of oscillator 10, which are applied, respectively, to the control terminals J and K of flip-flop 13. In the absence of synchronization between the oscillator and the input pulses the wave front D of the one voltage D will occur at any random period of time between the pulses of the series. This means that after wave front, D, the first pulse B applied to the clock terminal CL of the flip-flop will cause a change in state of the flip-flop and produce a voltage $\bar{Q}$ as shown on line 4 of FIG. 2. Then, when the oscillator resets the JK voltages to 0 the flip-flop is readied for reversal of state and is reversed by the first pulse, C, occurring thereafter. In FIG. 1 the negative-going voltage $\bar{Q}$ at time C is applied to the one-shot multivibrator 18 and initiates or ignites or triggers the beginning of the unstable state at the instant of pulse C, the set voltage being shown on line 5, FIG. 2. Since the duration of the unstable state of the multivibrator is adjusted to exceed the time interval between two pulses, less than twice this time interval, the pulse A is bound to occur during the enabling of the AND gate 21. This means that pulse A appears undistorted at the output terminal 2 of the AND gate. From the output terminal 2 the isolated pulse is applied to circuitry for measuring the parameters of the pulse.

Many modifications may be made in the specific details of the components of FIG. 1 without departing from the scope of the invention as defined in the appended claims.

What is claimed is:

1. A system for isolating substantially undistorted a single pulse from among a series of pulses, said system comprising;
   an AND gate having a control circuit and having a signal circuit connected between the source of said series of pulses and an output terminal connected to a utilization circuit for said single pulse, said signal circuit being normally disabled and being responsive to and enabled by an enabling voltage applied to said control circuit,
   a one-shot monostable multivibrator for generating an enabling voltage, the output of said multivibrator being connected to said control circuit, the duration of the unstable output voltage of said multivibrator being adjusted to exceed the duration of one interval between pulses of said series of pulses, but less than the duration of two intervals,
   means responsive to one pulse of said series for triggering said one-shot multivibrator to start said enabling voltage, the enabling voltage being applied to said control circuit to enable said AND gate until arrival and passage to said utilization circuit of the next succeeding pulse after said one pulse, wherein said means includes a bistable flip-flop triggered by a free-running oscillator.

2. In the system defined in claim 1, said bistable flip-flop comprising a clock control input circuit connected to said source of pulses and having two signal input circuits connected to two output terminals of said oscillator, said flip-flop being of the type which will change state in response to a clock pulse only after being readied by said complementary voltages, and
   means responsive to said change of state of said flip-flop for generating the triggering voltage for said multivibrator.

References Cited

UNITED STATES PATENTS

| | | | |
|---|---|---|---|
| 2,711,532 | 6/1955 | Slusser | 328—110 |
| 3,071,723 | 1/1963 | Gabor | 328—110 |
| 3,072,855 | 1/1963 | Chandler | 328—110 |
| 3,196,358 | 7/1965 | Bagley | 328—110 |
| 3,278,759 | 10/1966 | Rekiere | 307—233 |
| 3,284,659 | 11/1966 | Outhouse et al. | 307—273 |

DONALD D. FORRER, Primary Examiner

R. C. WOODBRIDGE, Assistant Examiner

U.S. Cl. X.R.

307—232, 247, 291